Patented July 17, 1951

2,561,068

UNITED STATES PATENT OFFICE 2,561,068

PROCESS FOR THE PREPARATION OF LONG-CHAIN ESTERS AND NITRILES

Donald C. Pease, Wilmington, Del., assignor to E. I. du Pont de Nemours and Company, Wilmington, Del., a corporation of Delaware No Drawing. Application June 30, 1949, Serial No. 102,438

7 Claims. (Cl. 260—465.8)

This invention relates to a new process for the preparation of long-chain dicarboxylic acids and derivatives.

Long-chain dicarboxylic acids and their functional derivatives which on hydrolysis give the long-chain dicarboxylic acids are of substantial economic importance, particularly for the preparation of condensation polymers such as nylon and alkyd resins. These dicarboxylic acids and derivatives are usually produced by oxidation of naturally occurring aliphatic and cyclic materials.

This invention has as an object a novel process for the preparation of functional derivatives of long-chain dicarboxylic acids which derivatives on hydrolysis yield the dicarboxylic acids. Another object is the preparation of long-chain dicarbonamides. A further object is the preparation of long-chain dinitriles. A still further object is the preparation of long-chain dicarboxylic acid esters. Another object is the preparation of long-chain dicarboxylic acids. Other objects will appear hereinafter.

These objects are accomplished by the following invention wherein a terminally unsaturated olefin of two to eight carbon atoms, i. e., an olefinic hydrocarbon of two to eight carbons having at least one terminal methylene, $CH_2=$, group, i. e., at least one terminal ethylene, $CH_2=C=$, group, i. e., at least one terminal double bond, is treated at a temperature of 25–150° C. with at least 10% by weight of the olefin of an organic azo compound wherein the azo, $-N=N-$, group is acyclic and bonded from each of its nitrogens to discrete tertiary carbons aliphatic in character, i. e., non-aromatic carbons, i. e., aliphatic or alicyclic carbons which carbons, being tertiary, are each attached to three other carbons, one of said other carbons being the carbon of a cyano, $-CN$, group, a carbonamido, $-CONH_2$, group or a carbalkoxy, $-COO$ Alkyl, group.

In general, this invention provides for the reaction of a polymerizable aliphatic monoolefin or diolefin hydrocarbon, e. g. propylene or butadiene, with relatively large amounts, e. g. 10–100% or more of an azonitrile, azoester or azocarbonamide, generally at 25–150° C. For an azo compound of the general structure

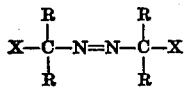

where R is a hydrocarbon radical and X is a nitrile, carbalkoxy or carbonamide group, which groups are readily converted to carboxyl groups, the products obtained by reaction with butadiene are represented by the formula

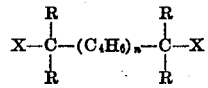

where $n$ is an integer, generally 2–15 and preferably 5–10. In general, the compounds wherein the R's are alkyls of 1–4 carbons or together are an alkylene radical forming with the tertiary carbon an alicyclic ring of 5 to 7 carbons are more readily obtained and are preferred.

The following examples in which parts are by weight are illustrative of the invention.

Example I

A stainless steel pressure-resistant vessel was charged with 120 parts of alpha, alpha'-azodiisobutyronitrile and 400 parts of butadiene. The vessel was closed and heated for 15 hours at 75° C. while being agitated. The vessel was opened and after the excess butadiene had escaped the product was heated under vacuum to obtain 232 parts of a viscous, colorless oil. This oil had a molecular weight 377 and nitrogen by the Dumas method 7.34%, corresponding to 27.7 parts of nitrogen per mole; calculated for the polybutadiene alpha,omega-dinitrile: 28 parts nitrogen. This product was distilled to yield fractions corresponding to $$NC-C(CH_3)_2-(C_4H_6)_n-C(CH_3)_2-CN,$$

where $n=2$ to 5.

Example II

A small stainless steel pressure-resistant vessel was charged with 50 parts of alpha, alpha'-azobis-(alpha,gamma-dimethylvaleronitrile) and 100 parts of butadiene. The vessel was closed and heated for 15 hours at 75° C. to obtain, after low molecular weight material was removed by heating, 114 parts of a light brown oil of low viscosity.

Example III

Into a glass pressure-resistant tube was put 10 parts of the dimethyl ester of alpha,alpha'-azodiisobutyric acid and 100 parts of butadiene. The glass vessel was sealed and heated for 15 hours at 75° C. while being gently rotated end over end. After removal of the excess butadiene and low molecular weight materials there remained 44 parts of a clear, colorless, viscous oil.

*Analysis.*—Calculated for the polybutadiene diester, $C_{74}H_{114}O_4$: C, 83.35%; H, 10.70%; molecular weight, 1066. Found: C, 83.90%; H, 10.92%; molecular weight 1033.

*Example IV*

A glass pressure-resistant vessel was charged with 10 parts of alpha-alpha'-azodiisobutyronitrile and 50 parts of isoprene. The vessel was sealed and heated for 20 hours at 70° C. while being rotated end over end. After removal of excess isoprene and low molecular weight volatile products by heating at 100° C. under vacuum there remained 27 parts of a clear, colorless oil.

*Example V*

A silver-lined vessel of 400 parts of water capacity was flushed with oxygen-free nitrogen and charged with 10 parts of alpha,alpha'-azodiisobutyronitrile and 80 parts of dry thiophene-free benzene. The vessel was closed, cooled, evacuated to remove nitrogen, placed in a shaker machine, and connected to a source of high pressure ethylene. The vessel was pressured to 450 atmospheres with ethylene and heating and agitation started. During 25 minutes the temperature was maintained at 45–55° C. and the pressure at 540–675 atmospheres. This was followed by a rapid surge of temperature and pressure to 152° C. and 1000 atmospheres. The atmosphere was quickly reduced to 450 atmospheres by venting gas, and in the following 4 minutes there was a 300 atmosphere absorption of ethylene. The vessel was then cooled, opened, and the contents discharged. The product was then separated into ether-soluble and ether-insoluble portions. The latter (30 parts) was a nitrogen-free wax melting at 103–106° C. The ether-soluble material was further separated into methanol-soluble and methanol-insoluble fractions and the former (8 parts) was recovered azo compound and the latter (7 parts) was a nitrogen-containing wax. Analysis showed this last product to contain 82.04% carbon, 12.82% hydrogen, and 4.34% nitrogen, and to have a molecular weight (ebullioscopic in benzene) of 509. Ammonia was evolved on hydrolysis of the nitrogenous wax in alcoholic alkali. The hydrolysate was acidified, evaporated to dryness, and extracted with benzene. The benzene solution was dried and the benzene evaporated. This yielded an acid having a neutral equivalent of 983.

*Example VI*

A pressure-resistant vessel was charged with 40 parts of benzene, 8.2 parts of alpha,alpha'-azodiisobutyronitrile, 75 parts of propylene and heated at 95–110° C. for 18 hours. After cooling, the reactor was opened and excess propylene removed by evaporation. The benzene solution was subjected to vacuum distillation, and there was obtained 3 parts of an oil which distilled at 100–140° C. at 1 mm. and which had 10.48% nitrogen. The residue (3 parts) contained 7.42% nitrogen. The distillable oil had a calculated molecular weight of 268 and an average of 3.1 propylene units per molecule while the residual oil had an average molecular weight of 377 with an average of 5.8 propylene units.

*Example VII*

The general process of Example VI was repeated except that 75 parts of butadiene was employed in the place of the propylene. Upon evaporation of the benzene an oil was obtained which did not distill below 200° C. at 1 mm. pressure. The oil contained 4% nitrogen and was calculated to have an average of about 10 butadiene units per two terminal cyanoisobutyl groups.

*Example VIII*

A solution of 6 parts of styrene and 1.11 parts of alpha,alpha'-azodiisobutyronitrile, tagged with radioactive cyano carbon atoms, in 94 parts of 95% alcohol, was refluxed for 6 hours. The mixture was cooled overnight, the separated high molecular weight product filtered off and washed several times with alcohol. The product was dried at room temperature to yield 0.324 part. This product contained 0.665% of total nitrogen and by radio assay was found to have 1.05 nitrogen atoms per end group, indicating that only the nitrile groups of the initiator were combined in the material.

*Example IX*

A stainless steel pressure vessel was charged with 30 parts of alpha,alpha'-azodiisobutyronitrile, 100 parts of benzene and 100 parts of propylene. It was closed, heated to 100° C. and held at that temperature for 1.5 hours. The vessel was opened and the viscous liquid remaining was filtered and warmed for several hours at 50–70° C. to evaporate the excess unreacted propylene. The concentrate was cooled and a crystalline precipitate removed by f· ration. Petroleum ether was added and the solution was cooled in Dry Ice and acetone to crystallize out the remaining unreacted azo nitrile. The filtrate was concentrated to leave on oil with a terpene-like odor. It was subjected to steam distillation to remove volatile components. The undistilled portion was dried and shown by analysis to be essentially a polypropylene dinitrile.

*Analysis.*—Molecular weight 304, 310; N, 10.18%; 10.00%. This corresponds to 30.9 g. nitrogen per mole vs. 28.0 g. by theory.

*Example X*

A mixture of 40 parts of alpha,alpha'-azodiisobutyronitrile and 200 parts of isobutylene was heated for 15 hours at 75° C. in a stainless steel pressure vessel. The viscous liquid so obtained was subjected to steam distillation to remove low molecular weight material and catalyst residues. After being dried, the product remaining consisted of 26 parts of light yellow, low viscosity liquid, which analysis indicated was a dinitrile contaminated with polyisobutylene or mononitriles.

*Analysis.*—Molecular weight 219, 221; N, 10.49%, 10.47%, corresponding to 23.1 g. of nitrogen per mole.

The process of the present invention is of generic applicability to azo compounds which have an acyclic azo group, —N=N—, bonded to different, i. e., discrete, carbons which are non-aromatic, i. e., aliphatic in character, i. e., aliphatic or cycloaliphatic, and tertiary, i. e., attached to three other carbons by single valences, with the tertiary carbon attached through carbon to a negative radical in which the three remaining valences of the latter carbon are satisfied by at least one element of atomic number 7 to 8, i. e., oxygen and:or nitrogen. The negative radicals are preferably neutral with respect to acidity and include the cyano, carbonamide and carbalkoxy groups. In general the carbalkoxy groups have alkyl radicals of 1–6 carbons. Examples of these preferred compounds include alpha,alpha'-azodiisobutyronitrile, alpha,alpha' - azobis(alpha,- gamma-dimethylvaleronitrile), alpha,alpha'-azobis(alpha-methylenanthonitrile), alpha,alpha'-azobis(alpha-methylbutyronitrile), alpha,alpha'-azobis(alpha-ethylbutyronitrile), alpha,alpha'-azobis(alpha-phenylpropionitrile), alpha,alpha'-azobis(alpha - cyclopropylpropionitrile), alpha,-alpha' - azobis(alpha - cyclohexylpropionitrile), alpha,alpha' - azobis(alpha-cycloheptylpropionitrile), alpha,alpha'-azobis(alpha-isopropyl-beta-methylbutyronitrile), alpha,alpha'-azobis(alpha,-gamma - dimethylcapronitrile), alpha,alpha'-azobis,(alpha - n - butylcapronitrile), alpha,-alpha'-azobis(alpha - isobutyl - gamma - methyl-valeronitrile), alpha,alpha' - azobis(a l p h a-methyl-gamma-carboxybutyronitrile) and the corresponding salts such as the sodium salt of the carboxy group, alpha,alpha' - azobis(alpha-methyl - beta - methoxypropionitrile), alpha,-alpha' - azobis(alpha-methyl-gamma-diethylam-inobutyronitrile), alpha,alpha' - azobis(alpha-methyl-delta-piperidinovaleronitrile), 1,1'-azodicyclohexanecarbonitrile, 1,1' - azodicycloheptylcarbonitrile, 1,1'-azobis(3-methylcyclopentanecarbonitrile), 1,1' - azobis(2,4 - dimethylcyclohexanecarbonitrile), and the azonitrile derived from camphor (1,1'-azodicamphanecarbonitrile) by the methods subsequently described, and the corresponding amides and esters of the above in which the cyano group or groups are replaced by amide and/or ester groups, e. g. to give alpha,-alpha'-azodiisobutyramide, alpha,alpha' - azobis (alpha - gamma - dimethylvaleramide), alpha,alpha' - azobis(alpha-cyclopropylpropionamide), 1,1'-azodicyclohexanecarbonamide, N,N'-alpha,-alpha'-azodiisobutyrodiethylamide, dimethyl, diethyl and dihexyl alpha,alpha'-azodiisobutyrate. Of the esters, the lower alkyl esters, e. g. of the 1-6 carbon alcohols are preferably used in view of the ease and economy in preparing such esters.

The azonitriles may be prepared by the process described by Thiele and Heuser, Ann. 290, 1–43 (1896), Hartmann, Rec. trav. Chim. 46, 150–153 (1927), Dox, J. Am. Chem. Soc. 47, 1471–1477 (1925) or by a particularly convenient method (that of Alderson and Robertson, Ser. No. 736,586, filed March 22, 1947, now Patent No. 2,469,358) wherein hydrazine is reacted with a ketone to form an azine which is reacted with excess hydrogen cyanide containing less than 50% of water to give the hydrazonitrile which is readily oxidized by chlorine in an aqueous medium to give the azonitrile. The azonitrile can be converted to amides or esters by formation of the iminoether hydrochloride by reaction with dry hydrogen chloride and an anhydrous alcohol followed by reaction with ammonia or hydrogen bearing amine to form amides or with water to form the esters. Thiele and Heuser (cited above) show the preparation of azo esters and amides.

Generally the more useful azo compounds have aliphatic and/or cycloaliphatic radicals of 4 to 11 carbons on each of the azo nitrogens and usually have carbon, hydrogen, oxygen, and/or nitrogen as the elements in the radical. Preferably the compounds are symmetrical azobisnitriles having hydrocarbon radicals as the only other substituents. The particularly preferred compounds are the azobis (alpha-cyanoalkanes) wherein the cyanoalkyl groups are each of 4 to 8 carbons and the "alpha" refers to the carbon attached to the azo nitrogen.

The process of this invention is of generic applicability to polymerizable olefinic hydrocarbons of two to eight carbons having at least one $CH_2=C<$ group, including ethylene, propylene, isobutylene, butadiene, isoprene, and styrene. These compounds are hydrocarbons having 1 to 2 ethylenic linkages and at least one $CH_2=$ group.

The reaction conditions depend upon the specific olefinic hydrocarbon and azo compound employed. In general, the temperature at which the azo compounds reacts is the more important limitation and is within the range of 0–200° C. with temperatures of 25–150° C. most generally employed. Under these conditions of temperature, the olefinic compound is generally gaseous and pressure-resistant equipment must be employed with superatmospheric pressures to obtain a sufficient concentration of olefinic compound. Pressures of from 1 to 1000 atmospheres are generally employed.

The azo compound is present in amounts of at least 10% based on the weight of olefinic hydrocarbon. When amounts less than this are employed, low yields of difunctional carboxylic derivatives are obtained with a relatively large amount of high molicular weight polymeric material. Preferably the azo compound is present in an amount of from 10–100% based on the weight of the olefinic compound. In view of the relative cost of the azo compound, large excesses of the azo compound are generally avoided.

Liquid phase reaction conditions are customarily used. In the event that the monomeric olefin is gaseous under the reaction conditions, an inert solvent for both the azo compound and the olefinic hydrocarbon should be employed. Representative solvents include benzene and cycylohexane.

The reaction gives rise to alpha, omega-dicarboxylic esters, amides and dinitriles as illustrated by the examples. These compounds can be converted by hydrolysis or hydrogenation into various derivatives such as the diacids and diamines. The hydrogenation to diamines is disclosed in greater detail in Paul Arthur, Jr., Serial No. 102,713, filed July 1, 1949. The diacids obtainable from the reaction products of an azo compound and butadiene are useful in the preparation of polymers for film and fiber applications. Thus, the diacids or derivatives derived from the reaction of butadiene and an appropriate azo compound may be used to form air-drying films, since they have ethylenically unsaturated groups. The products of the butadiene reaction of an azonitrile and butadiene have the general structure

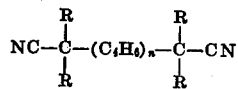

wherein the R groups are preferably hydrocarbon groups of 1 to 4 carbons each (or two together form an alicyclic ring of 5 to 7 carbons) in which the recurring $C_4H_6$ unit may have the structure,

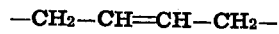

or

By perbenzoic acid titration studies, the ratio of these recurring units in the dinitriles and dicarboxylic acid derivatives obtainable therefrom is about 80 and 20, respectively, i. e., about 80% of the recurring $C_4H_6$ units have the normal chain structure while about 20% have the branched chain structure. The ethylenic unsaturated linkages in these dicarboxylic compounds are not conjugated and attempts to isomerize them to conjugated structures are not generally successful. The dicarboxylic compounds are useful for the preparation of polyamides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of compounds having a chain of a plurality, from 2 to 15, of recurring bivalent units corresponding to a polymerizable terminally unsaturated olefin of two to eight carbons, the two terminal valences of the chain being each bonded to a tertiary carbon, aliphatic in character, one of the carbons attached to said tertiary carbon having its remaining valences satisfied by at least one element of atomic number of 7 to 8 which comprises heating said polymerizable olefin with from 10% to 100% of its weight of an azo compound wherein the two valences of the acyclic azo, —N=N—, group are each bonded to a discrete tertiary carbon, with one of the carbons attached to said tertiary carbon being the carbon of a group of the class consisting of the nitrile group and the esterified carboxyl group, and isolating said compounds having a chain of recurring bivalent units.

2. Process of claim 1 wherein the olefin is butadiene.

3. A process for the preparation of compounds having a chain of a plurality, from 2 to 15, of recurring bivalent units corresponding to a polymerizable terminally unsaturated olefin of two to eight carbons, the two terminal valences of the chain being each bonded to tertiary carbon, aliphatic in character, of a monovalent cyanohydrocarbon radical wherein the cyano group is attached to said tertiary carbon which comprises heating said polymerizable olefin with from 10% to 100% of its weight of an azo compound wherein the two valences of the acyclic azo, —N=N—, group are each bonded to a discrete tertiary carbon, aliphatic in character, of a monovalent cyanohydrocarbon radical wherein the cyano group is attached to said tertiary carbon and isolating said compounds having a chain of recurring bivalent units.

4. Process of claim 3 wherein the olefin is butadiene.

5. A process for the preparation of compounds having a chain of a plurality, from 2 to 15, of recurring bivalent units corresponding to a polymerizable terminally unsaturated olefin of two to eight carbons, the two terminal valences of the chain being each bonded to a cyanoalkyl radical wherein the free valence stems from tertiary carbon bearing the cyano group which comprises heating said olefin with from 10 to 100% of its weight of an azo compound wherein the two valences of the acyclic azo, —N=N—, group are each bonded to a discrete tertiary carbon, bearing a cyano group, of a cyanoalkyl radical and isolating said compounds having a chain of recurring bivalent units.

6. Process of claim 5 wherein the olefin is butadiene.

7. Process of claim 6 wherein the azo compound is azodiisobutyronitrile.

DONALD C. PEASE.

REFERENCES CITED

The following references are of record in the file of this patent:

UNITED STATES PATENTS

| Number | Name | Date |
|---|---|---|
| 2,352,461 | Walker | June 27, 1944 |
| 2,433,015 | Rolane et al. | Dec. 23, 1947 |
| 2,433,016 | Coffman | Dec. 23, 1947 |
| 2,469,358 | Alderson et al. | May 10, 1949 |
| 2,471,959 | Hunt | May 31, 1949 |
| 2,498,621 | Kropa et al. | Feb. 2, 1950 |
| 2,500,023 | Bark | Mar. 7, 1950 |

OTHER REFERENCES

De Bell et al.: German Plastics Practice, Off. Q. M. General, Mil. Planning Div., Res. and Dev. Br.; Report No. P. B. 122467, November 1945, pp. 1122 and 1129.

Certificate of Correction

Patent No. 2,561,068                                                            July 17, 1951

DONALD C. PEASE

It is hereby certified that error appears in the printed specification of the above numbered patent requiring correction as follows:

Column 3, line 28, for "The atmosphere" read *The pressure*; column 5, line 12, after "azobis" strike out the comma; column 6, line 23, for "molicular" read *molecular*; line 68, for "CH$_2$—CH(CH=CH$_2$)—"     read     *—CH$_2$—CH(CH=CH$_2$)—* column 7, line 2, for "conjuated" read *conjugated*; column 8, line 36, list of references cited, under "UNITED STATES PATENTS", for "Rolane et al." read *Roland et al.*; line 45, under "OTHER REFERENCES", for "Report No. P. B. 122467" read *Report No. P. B. 12467*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*